(12) United States Patent
Peterson et al.

(10) Patent No.: US 6,644,905 B1
(45) Date of Patent: Nov. 11, 2003

(54) BIN FILLER FOR FRUIT CROPS (75) Inventors: Donald L. Peterson, Martinsburg, WV (US); Scott D. Wolford, Martinsburg, WV (US)

(73) Assignee: The United States of America, as represented by the Secretary of Agriculture, Washington, DC (US)

(*) Notice: Subject to any disclaimer, the term of this patent is extended or adjusted under 35 U.S.C. 154(b) by 0 days.

(21) Appl. No.: 10/046,850

(22) Filed: Jan. 14, 2002

Related U.S. Application Data (63) Continuation-in-part of application No. 09/875,028, filed on Jun. 7, 2001, now Pat. No. 6,442,920.

(51) Int. Cl.$^7$ .............................................. B65G 57/00
(52) U.S. Cl. ....................................... 414/295; 198/317
(58) Field of Search .............................. 56/327.1, 328.1; 414/793.5, 793.8, 794.4, 293–295, 147.1; 53/244, 245, 247, 259, 447, 448, 535, 537, 540; 198/478, 535, 715, 502.2, 317

(56) References Cited

U.S. PATENT DOCUMENTS

| | | | | |
|---|---|---|---|---|
| 4,067,432 A | * | 1/1978 | Powell, Sr. | 414/295 |
| 4,194,343 A | * | 3/1980 | Myers et al. | 53/493 |
| 4,501,350 A | * | 2/1985 | Muller et al. | 198/477.1 |
| 5,794,415 A | * | 8/1998 | Huff et al. | 53/475 |

* cited by examiner

Primary Examiner—Robert E. Pezzuto
(74) Attorney, Agent, or Firm—John D. Fado; Randall E. Deck (57) ABSTRACT

An apparatus for conveying/dispensing produce susceptible to damage upon impact. The apparatus includes a produce conveyor assembly adapted to receive, transport, and gently deposit produce into an open topped bin or container.

19 Claims, 6 Drawing Sheets

BIN FILLER FOR FRUIT CROPS

CROSS REFERENCE TO RELATED APPLICATIONS

This application is a Continuation-In-Part of U.S. patent application Ser. No. 09/875,028, filed Jun. 7, 2001, now U.S. Pat. No. 6,442,920, the contents of which are incorporated by reference herein.

BACKGROUND OF THE INVENTION

1. Field of the Invention

The invention relates to an apparatus for conveying and gently dispensing produce into containers such as bins.

2. Description of the Prior Art

Conventional produce harvesting and packing devices subject the produce to bruising and damage as a result of being dumped into bins or other containers. Considerable bruising results in fruits or vegetables when the energy of the falling articles is absorbed on impact with hard surfaces or other articles already in the bin.

A number of bin fillers have been developed, and include, for example, those described by Jesperson and Jesperson (U.S. Pat. No. 4,965,982) and in Principles & Practices for Harvesting & Handling Fruits & Nuts [Obrien et al. (ed.), AVI Publishing, Westport, Conn. 1983, pp. 257–261, 383–389, and 441–447]. However, despite these advances the need remains for an improved filling device which reduces the damage to the produce.

SUMMARY OF THE INVENTION

We have now invented an apparatus for conveying and dispensing produce susceptible to damage upon impact which includes:

a. a frame;

b. an upwardly disposed, revolving conveyor loop supported by the frame;

c. a plurality of projections extending outwardly from the conveyor loop to support and carry produce thereon as the conveyor revolves;

d. side walls positioned on each side of the conveyor loop effective for preventing produce from falling off the sides of the projections; and e. a cover over at least the lower portion of the conveyor loop on the same side thereof which rotates toward the bottom of the loop, the cover being spaced from the conveyor a distance sufficient to allow the passage of the projections and the produce thereon, and further wherein the cover is open at the bottom of the loop to allow the discharge of produce into the bin.

Each of the conveyor loop, the projections, and the inner surface of the cover plate are constructed of or covered with a kinetic energy absorbing material.

In accordance with this discovery, it is an object of the invention to provide an apparatus for dispensing fruit or vegetables into bins or other containers in a uniform distribution and which minimizes the impact received by the produce.

Another object of this invention is to provide a conveyor/dispenser device which may be used in conjunction with other mechanical harvesters for automated or semi-automated harvesting and packing of fruit or vegetables susceptible to damage upon impact.

Other objectives and advantages of the invention will become readily apparent from the ensuing description.

DETAILED DESCRIPTION OF THE INVENTION

The apparatus of the invention is effective for receiving, conveying, and uniformly distributing produce or other articles into bins or other open-topped containers with little or no damage. While the invention is suitable for the handling of a variety of articles, it is particularly effective for the handling of fruits and vegetables, such as apples, citrus, pears, peaches, cherries, apricots, plums, and nectarines. In one embodiment, the apparatus may be used for packaging articles such as in a fruit-packing plant. However, in the preferred embodiment the invention is used in combination with an automated or semi-automated mechanical harvester, particularly, but not limited to use as a bin-filler with the mechanical harvester disclosed in copending application Ser. No. 09/875,028, filed Jun. 7, 2001, the contents of which are incorporated by reference herein.

Referring now to the Figures, the preferred embodiment for the apparatus includes a conveyor/dispenser assembly 10 for receiving produce 1 from a delivery chute 30, and conveying and dispensing the produce into a container 40. The conveyor/dispenser assembly 10 is constructed with a revolving conveyor loop 11 mounted on frame 12 whereby it is maintained in an upward disposition (i.e., the loop carries the produce from an elevated receiving position to a lower dispensing position). The conveyor loop may be either round or elongated, although oval loops are typically preferred, and it may be upright or inclined. To transport the produce along the path of the conveyor loop, a plurality of projections, flights or paddles 13 are provided extending outwardly from the loop, and spanning substantially across its width. The projections 13 are of a sufficient size and extend at an angle to the loop effective to support and carry produce thereon as it revolves until it is to be dispensed near the bottom of the loop (i.e., at the lower limit of its path of travel). In the preferred embodiment shown in the Figures, the projections are approximately perpendicular to surface of the loop or its tangent to facilitate produce being alternately supported and carried on first the front surface 14 and then the back surface 15 of the projections as described in greater detail hereinbelow under the method of operation. First and second side walls 16 and 17 are positioned on each side of said conveyor loop for preventing produce from falling off the sides of said projections.

Figure 2:
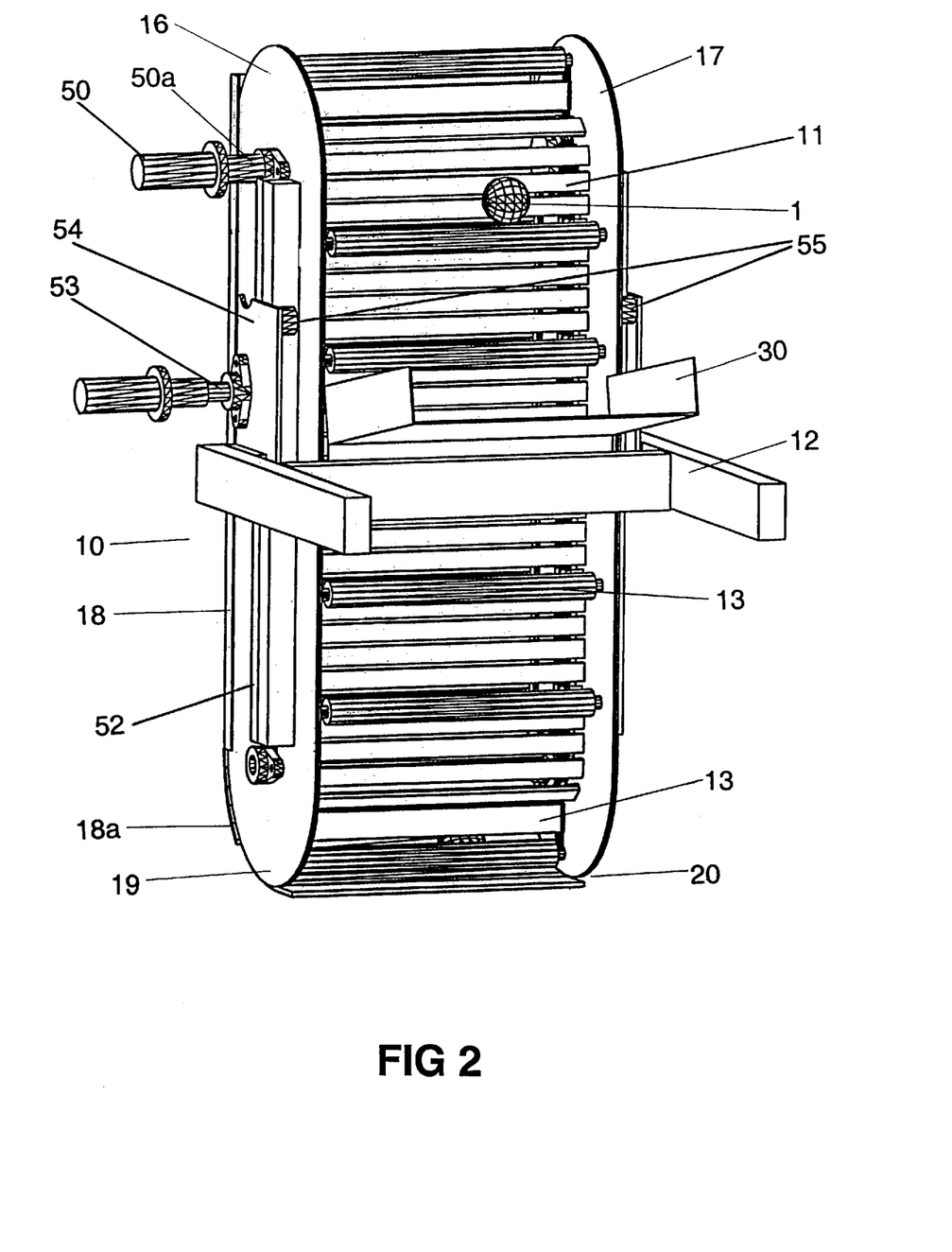
FIG. 2 is a detailed view of the conveyor apparatus.
Figure 4:
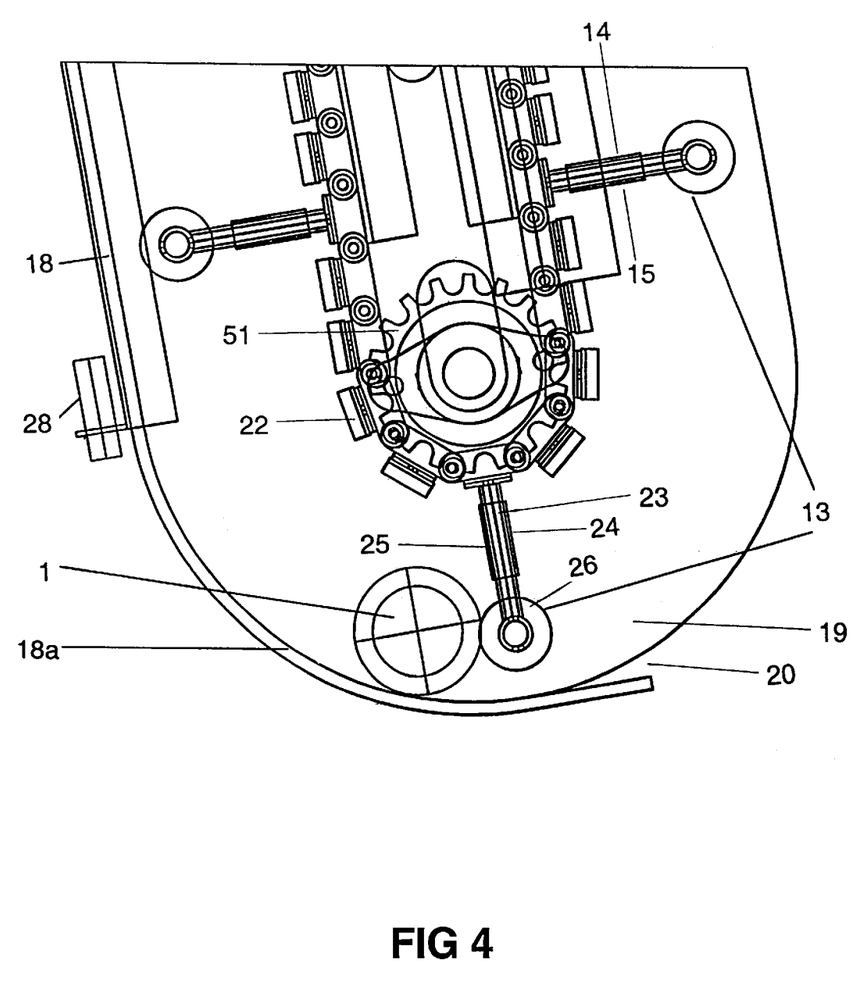
FIG. 4 is an expanded side view of the bottom of the conveyor for produce discharge.

To minimize the impact of the produce when it is dispensed, a cover 18 is provided on the same side of the conveyor loop 11 which rotates toward the bottom 19 thereof (i.e., toward the interior of the container 40). Cover 18 extends across at least that lower portion of the loop wherein the projections 13 become downwardly inclined as the loop rotates, thereby further preventing the produce from rolling off the projections and falling into the container from a height above the bottom 19 of the loop. Although cover 18 may be fixed along its entire length to the conveyor/dispenser assembly, in the preferred embodiment it is not attached at its lower end (i.e., at the above-mentioned lower portion of the loop 11). Rather, the lower end of the cover is constructed of a flexible material and may hang as a flap 18a with its free end extending downstream toward the direction of rotation of the conveyor loop 11 (see FIGS. 2 and 4). In this embodiment, the flap will rest on the bottom of container 40 or subsequently on the rising level of produce therein, thereby maintaining it under the bottom 19 of the conveyor loop to receive the produce coming off the loop. Produce is gently discharged from the conveyor/dispenser assembly through opening 20 in the cover plate. Thus, as the conveyor loop 11 carrying produce rotates downwardly and projections 13 become downwardly inclined (see FIG. 4), the produce 1 gradually rolls or slides into contact with the interior surface of the cover, and is moved along that surface to opening 20 whereat the produce is gently rolled into container 40.

Figure 1:
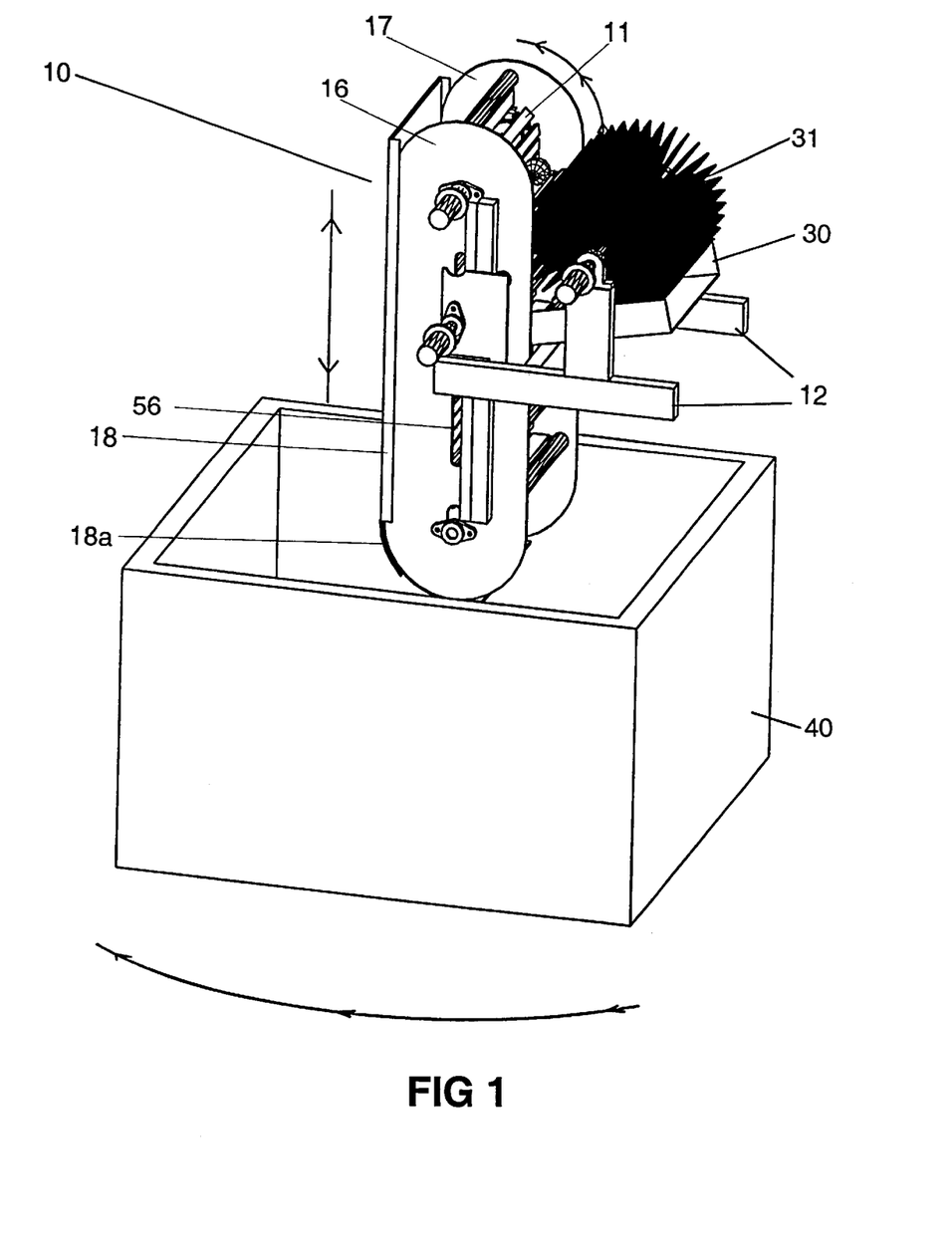
FIG. 1 is a perspective view of the dispensing apparatus showing the direction of movement of the components.

In addition, if the direction of rotation of the conveyor loop 11 carries the produce over the top of the loop (as shown in FIG. 1), then cover 18 is also preferably extended near the top of loop (on the side rotating in the downward direction). Cover 18 should be provided at a distance sufficiently close to the top of the loop as to effectively prevent the produce from being inadvertently thrown from the conveyor as it passes over the top. Further protection of the produce may be afforded by optionally extending cover 18 over substantially the entire lengths of the faces of the loop 11. As shown in FIG. 1, in the preferred embodiment the cover extends over that side of the loop which carries the produce in a downward direction. The cover is preferably spaced as near to the conveyor loop 11 as necessary to allow the passage of the projections 13 and produce thereon.

Figure 3:
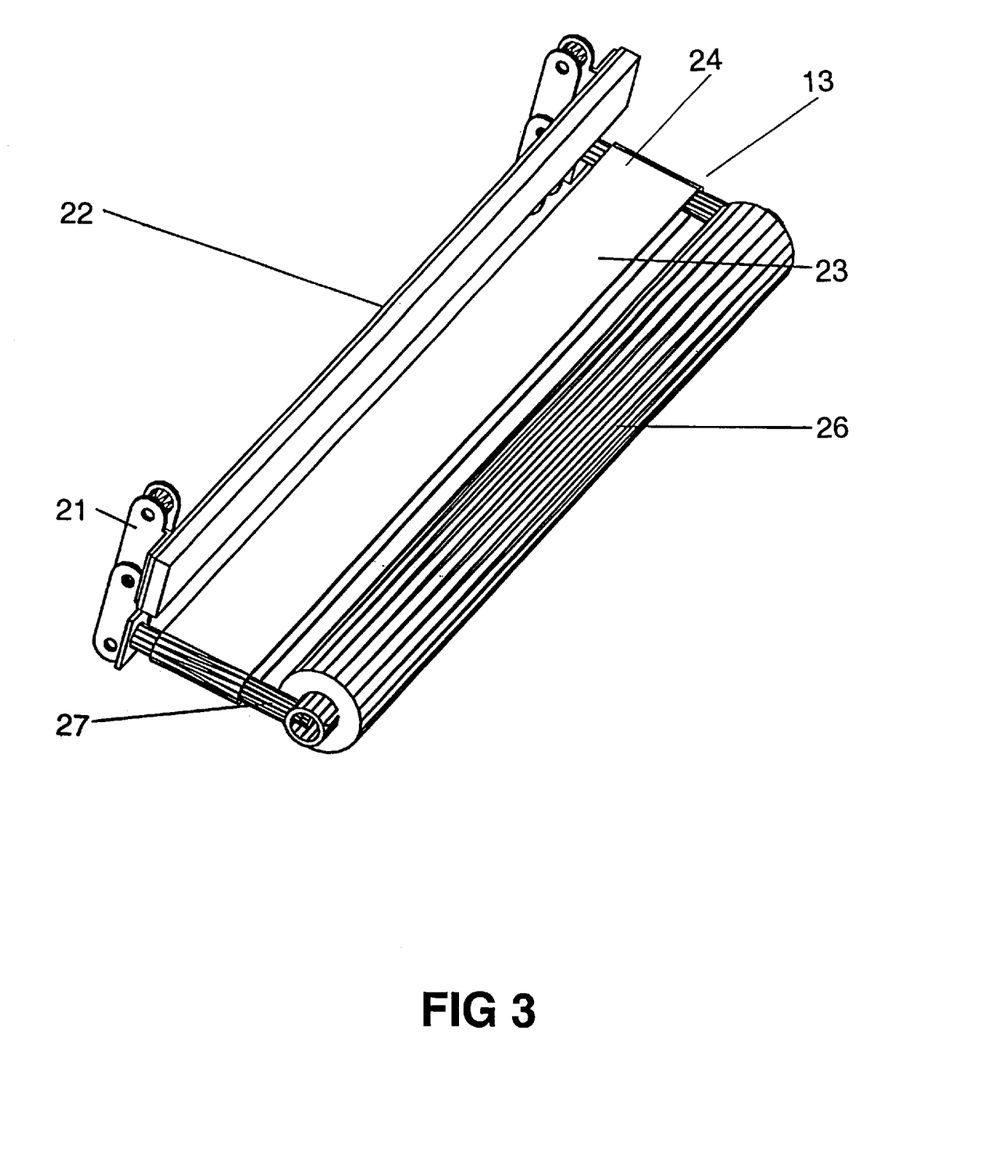
FIG. 3 is an expanded perspective view of the conveyor loop and projections in a first, preferred embodiment.

The conveyor loop 11 and projections 13 may be constructed from a variety of materials. Thus, without being limited thereto, suitable loops may be constructed from conventional continuous, endless belts or assembled from a plurality of hinged or flexibly attached linked pieces, while the projections may be constructed as a conventional paddle. However, in the preferred embodiment shown in FIGS. 3 and 4, the conveyor loop is constructed from at least two substantially parallel spaced apart rotating lines 21, such as chains, cables, or ropes (a chain is shown), with a plurality of cross members 22 extending substantially normal therebetween and supported thereon. The particular shape of the cross members is not critical, and include slats or panels, pipes or rollers. In this preferred embodiment, the projections 13 include a first inner support 23 which is adjacent to (contacting or out of contact with) the conveyor loop, and having substantially planar front and back surfaces 24 and 25 which are of sufficient depth for supporting produce thereon. A second outer retention support 26 is positioned adjacent to the inner support. These second supports 26 include raised portions that extend above the planes extending from at least one but preferably both of the front and back surfaces 24 and 25, a distance effective to prevent the produce from prematurely rolling off the inner support when the inner support are horizontally disposed. Although the second outer support may have a variety of shapes including bars, prisms, and other polygonal cylinders, cylinders with rounded circular or oval cross sections are preferred to eliminate sharp edges which may inflict damage upon the produce. As shown in detail in FIG. 3, both the inner support 23 and second outer retention support 26 are attached to line 21 through a spacer bar or pipe 27.

In a particularly preferred embodiment, the conveyor/dispenser assembly 10 includes a distance sensor 28 which is effective for detecting the distance between the outlet 20 of the conveyor (i.e., bottom 19) and the level of produce in a container 40 in which the assembly is disposed. In this embodiment, the conveyor/dispenser assembly 10 and container 40 are adapted to move vertically relative to one another. In brief, when filling an empty container, the conveyor/dispenser assembly is positioned near the bottom of the container to minimize the distance from outlet 20. As the container is filled, the level of the produce is detected by sensor 28, and the assembly 10 is raised or container 40 lowered to maintain the outlet 20 slightly above the level of the produce. Conventional motors, or hydraulic or pneumatic cylinders activated by the detector are provided for automatically controlling the vertical movement.

Damage to the produce may be further minimized by either covering (padding) or constructing any component which contacts the produce from with a kinetic energy absorbing material. A variety of materials are suitable for use herein and include conventional padding and resilient materials such as foam, mesh, felt, and pipe insulation. Specifically, in the preferred embodiment, all of the conveyor loop 11, the interior surface of said cover 18, and projections 13 (both of said front and back surfaces) are constructed of or covered with a kinetic energy absorbing material. For example, in the embodiments of FIGS. 2–4, cross members 22 may be formed from foam covered panels, while the first inner support 23 may be an elastic band stretched between spacer bars 27, and the second outer retention support 26 may be a foam-covered pipe.

The conveyor/dispenser assembly 10 of the invention may be constructed as a separate unit which may be combined with or "retrofitted" to an existing harvester or packing plant. However, in the preferred embodiment, the assembly is provided with one or both of a delivery chute 30 and a container or bin 40 as a single, integral unit. In a particularly preferred embodiment, the apparatus of the invention is employed as the filler of mechanical harvester described in U.S. patent application Ser. No. 09/875,028 referred to hereinabove.

The design of the delivery chute 30 is not critical, and a variety of chutes may be used for dispensing produce onto one of said projections. To facilitate the transfer of the produce onto the projections 13, the chute is-preferably inclined and positioned intermediate the top and bottom of the conveyor loop 11. The uniform delivery of the produce onto the projections is also enhanced by providing a means 31 for slowing the velocity of produce on the delivery chute toward the conveyor. A preferred means for slowing includes a rotating feed brush (including brushes having soft bristles or flexible paddles) positioned above the delivery chute. The brush may rotate in either direction, but preferably rotates in a direction toward the conveyor loop. This brush is positioned from the chute a distance effective to contact the produce and slow its speed, but not to prevent its passage. The precise spacing will vary with the stiffness of the brush and the momentum of the produce being handled. Alternatively, other suitable means for slowing may include at least one flexible member such as a resilient pad or flap, or a curtain or strands of heavy material hanging above or extending above the delivery chute.

Container 40 may also be of a variety of shapes, sizes, and materials of construction. In the preferred embodiment, container 40 is a open-topped bin having a bottom and side walls, and having a cross-section sufficiently large to accommodate at least the lower end of the conveyor/dispenser assembly 10 as described hereinabove. In any event, the bottom of the container is positioned below the conveyor/dispensing assembly 10. In addition to the vertical movement relative to the conveyor/dispenser assembly 10, the container is also preferably rotatable in a horizontal plane. Assembly 10 is disposed off the center of the container, for example, with side wall 16 positioned near the center of the container and side wall 17 positioned near a side wall of the container. Thus, as the container rotates or spins in the direction shown by the arrow in FIG. 1, that side wall of the container which is nearest to side wall 17 will be moving in the same direction as the conveyor belt at bottom end 19. In this adaptation, the movement of the container will pull or maintain flap 18a in an extended disposition and prevent its binding.

Rotation of the conveyor loop 11 and container 40 are effected by conventional motors and lifting devices. The skilled practitioner will recognize that conventional drive mechanisms for rotating the loop such as drive belts or gears should be provided. In the preferred embodiment shown in the Figures, a motor 50 drives shaft 50a attached to sprocket 51 (FIG. 4) which rotates conveyer loop 11. For vertical movement of the conveyor/dispenser assembly 10, a rack 52 is attached to each side wall 16 and 17, which racks are engaged by pinions secured to a common shaft 53. The pinion shaft 53 is motor driven and bearing supported by stationary plates 54 secured to frame 12. A pair of cam followers 55 attached to the stationary plates ensure that the rack and pinion are engaged. A slot 56 may be provided on each side of the assembly 10 to permit the pinion shaft to move without restriction.

In operation, produce is delivered onto the projections 13 of the rotating conveyor loop 11 by delivery chute 30. The conveyor loop may revolve in either direction, i.e., with the produce being conveyed directly downward from the delivery chute 30 before they are dispensed from opening 20, or upwardly from the delivery chute before being conveyed downwardly to opening 20 as shown. However, in a first preferred embodiment shown in FIG. 1 (the direction of rotation shown by the arrows), the. potential for produce damage and pinching at the point of transfer from the chute onto the projections is minimized by first conveying the produce upwardly from the chute, whereupon the produce is subsequently carried over the top of the conveyor loop 11 and then downward to opening 20. In this embodiment, the produce is carried on the front surface 14 of a first projection in an upward direction, and travels over the top of the conveyor 31 loop. After passing over the top, the produce are relocated to the opposite (back) surface 15 of the preceding projection. As the produce reaches the bottom of the conveyor loop, the projection lays the produce onto the interior surface of cover flap 18a, where it gently rolls out of opening 20 into container 40.

Figure 5:
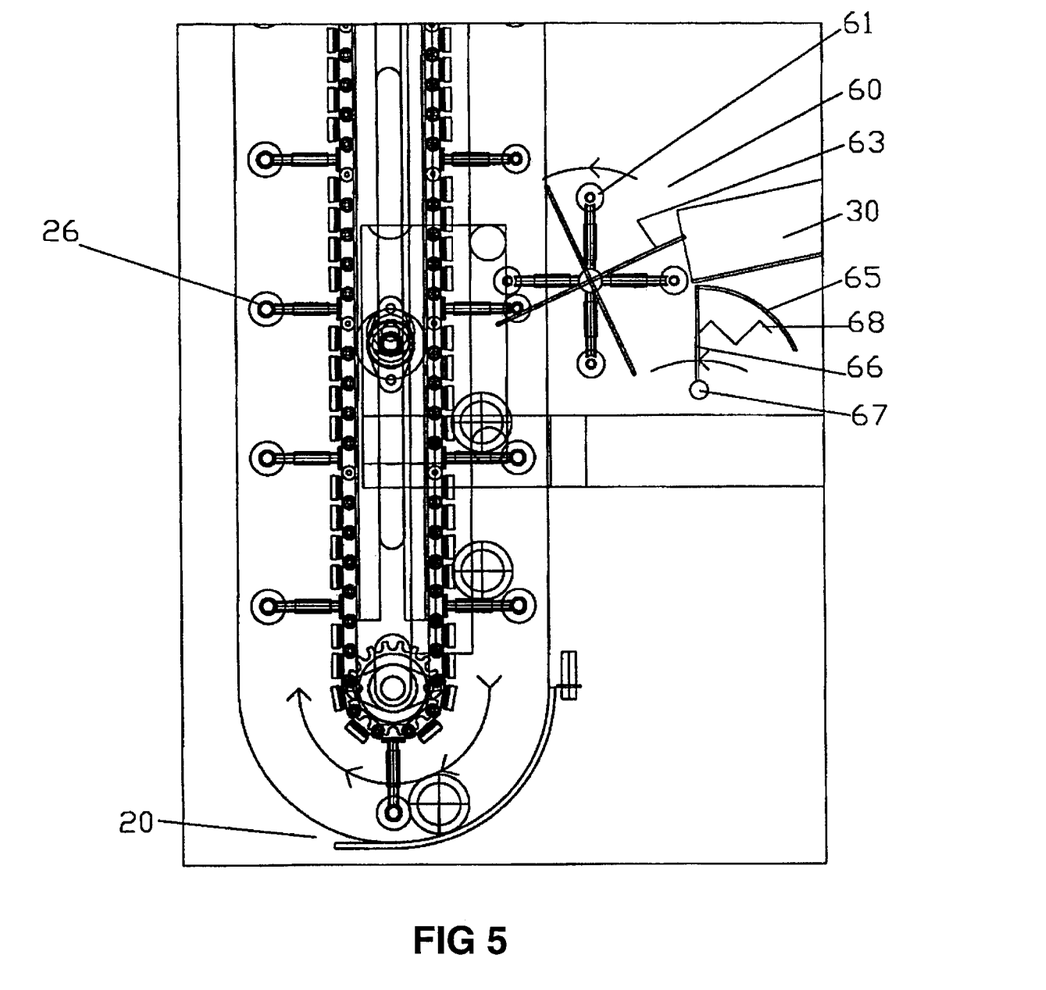
FIG. 5 shows a side view of a second, alternative embodiment wherein the produce may be conveyed directly downwardly.
Figure 6:
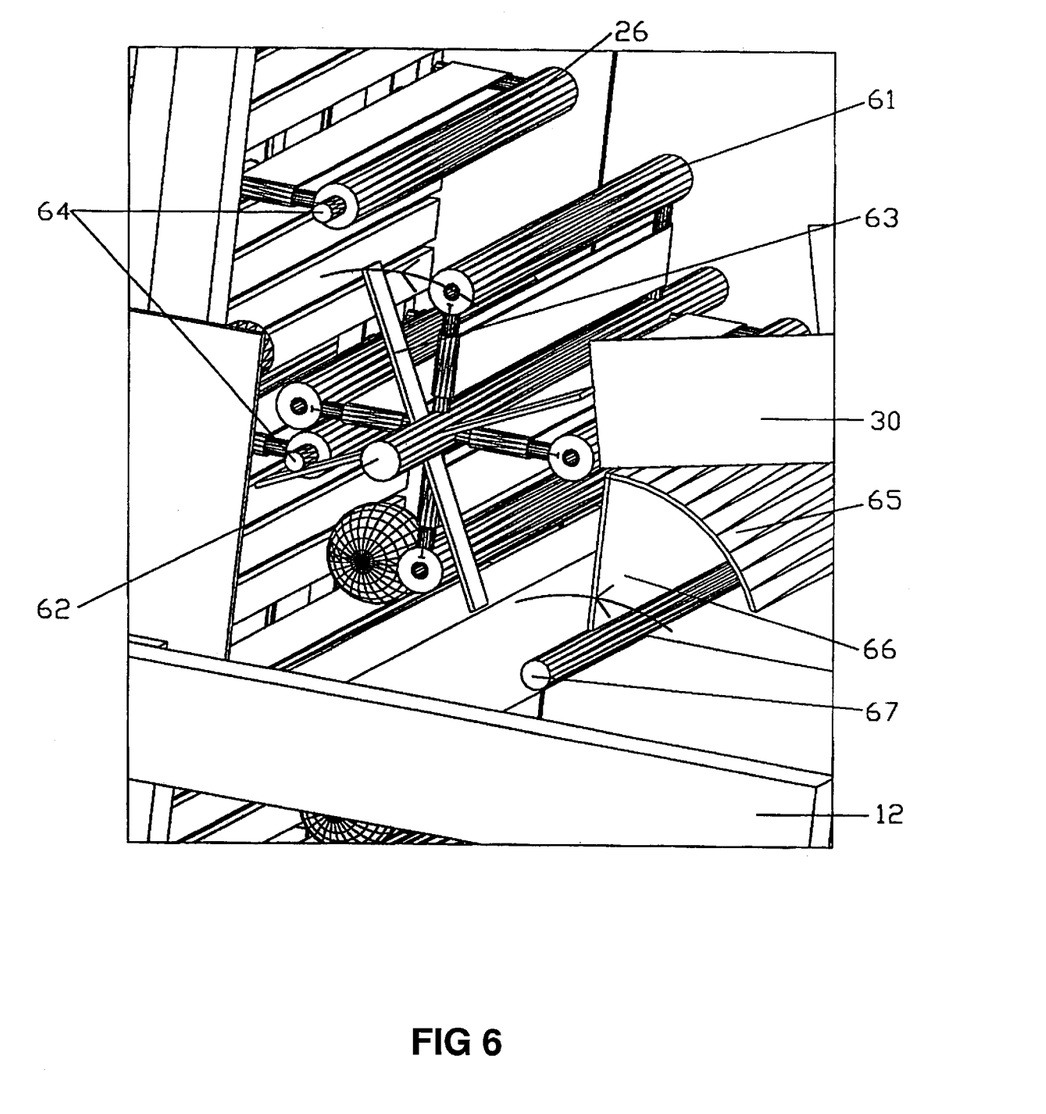
FIG. 6 shows a perspective view of the apparatus of the embodiment shown in FIG. 5.

FIGS. 5 and 6 show a second, alternative preferred embodiment wherein the produce may be conveyed directly downward from delivery chute 30 without damage. This embodiment employs a paddle transfer mechanism 60 intermediate between the chute 30 and the conveyor loop 11, which will receive the produce from delivery chute 30 and place it in the conveyor loop 11, whereupon it will be conveyed directly downwardly to opening 20. The skilled practitioner will recognize that in this embodiment, because cover 18 and flap 18a are positioned on the same side of the conveyor loop which moves downward, they are positioned on the opposite side of the conveyor loop as in the first embodiment of FIG. 1.

The transfer mechanism 60 includes substantially equally radially spaced projections or paddles 61 (which may be constructed similarly to projections 13 described above) attached to a freely rotating shaft 62. Shaft 62 may be bearing supported (not shown) to frame 12. To effect rotation of the paddle transfer mechanism, a plurality of equally radially spaced, outwardly extending drive arms 63 are provided which are attached to shaft 62. These arms 63 are angularly offset from the paddles 61, and should be of a sufficient length to contact projections 13 such that they may be engaged and turned by the projections as the conveyor loop 11 rotates. Arms 63 should also be spaced outwardly from the sides of the delivery chute 30, preferably adjacent to one or both ends of shaft 62, to avoid contact with the chute or produce thereon. In the preferred embodiment, projections 13 include extension pins or bearings 64 extending laterally outwardly from the ends thereof, which are effective for engaging drive arms 63, and thus rotating shaft 62 and paddles 61 as the conveyor loop 11 moves down. In this embodiment, projections 61 and the outer retention supports 26 of projections 13 may therefore be substantially the same width. Alternatively, it is envisioned that drive arms may contact the second, outer retention support 26. In use, produce from chute 30 is passed onto and supported by the paddle 61 which is adjacent thereto. Simultaneously, as conveyor loop 11 moves downward, pins 64 (or projections 13) contact drive arms 63, rotating transfer mechanism 60 in the direction shown by the arrows, whereupon the produce is carried over and deposited onto a successive projection 13.

To prevent produce from being trapped or lost between delivery chute 30 and incoming projections 61 (i.e., which are not yet adjacent to the chute), an arched panel 65 is positioned below delivery chute 30, which is movable toward transfer mechanism 60. The panel 65 is supported by arm member 66 that is in turn attached to pivot shaft 67. Pivot shaft may also be bearing supported (not shown) to frame 12. Arched panel 65 is retractably extended toward the transfer mechanism by spring 68 or by a torsion spring on shaft 67. During operation of this embodiment, spring 68 ordinarily applies force to urge arched panel 65 toward the conveyor loop 11. When projections 61 are at their greatest distance from the delivery chute 30, the panel will be forced toward loop 11, whereupon any small pieces of produce rolling off chute 30 will be supported thereon without falling. As shaft 62 rotates and a projection 61 rotates upwardly toward the chute 30, it will contact arm 66, gradually moving panel 65 under chute 30 and simultaneously transferring any produce from the arch onto the projection.

It is understood that the foregoing detailed description is given merely by way of illustration and that modifications and variations may be made therein without departing from the spirit and scope of the invention.

We claim:

1. An apparatus for gently dispensing produce into a container comprising:

a. a frame;

b. an upwardly disposed, revolving conveyor loop supported by said frame;

c. a plurality of projections extending outwardly from said conveyor loop, said projections being of a sufficient size and extending at an angle effective to support and carry produce thereon as said conveyor revolves before dispensing said produce at approximately the bottom of said loop, and wherein said projections comprise a first inner support adjacent to said conveyor loop and which comprises substantially planar front and back surfaces of sufficient depth for supporting produce thereon, and a second outer retention support having raised portions which extends above the planes of each the front and back surfaces of said first inner support effective for hindering produce on said first inner support from inadvertently rolling thereoff when said first inner support is horizontally disposed;

d. first and second side walls, one of said side walls being positioned on each side of said conveyor loop and effective for preventing produce from falling off the sides of said projections; and e. a cover spaced from and extending across at least the lower portion of said conveyor loop on the same side thereof which rotates toward the bottom of said loop, said cover being spaced from said conveyor a distance sufficient to allow the passage of said projections and produce thereon, and further wherein said cover is open at the bottom of said conveyor loop to allow the discharge of produce therefrom;

and further wherein said conveyor loop, the interior surface of said cover, and said projections are constructed of or covered with a kinetic energy absorbing material.

2. The apparatus of claim 1 further comprising a bin having a bottom and side walls, said bottom of said bin being positioned below said conveyor loop, wherein said bin and said loop are movable relative to one another in both the vertical and horizontal directions, and said bin is of a size effective such said conveyor may descend therein.

3. The apparatus of claim 1 wherein said conveyor loop comprises a continuous endless belt.

4. The apparatus of claim 1 wherein said conveyor loop comprises at least two substantially parallel spaced apart flexible lines and a plurality of cross members extending substantially normal between said lines and supported on said lines.

5. The apparatus of claim 1 further comprising a distance sensor effective for detecting the distance between said bottom of said conveyor and the level of produce in a container in which said conveyor is disposed.

6. The apparatus of claim 1 wherein said second outer support is substantially cylindrical having a circular or oval cross-section.

7. The apparatus of claim 1 wherein said loop is approximately oval shaped.

8. The apparatus of claim 1 further comprising a delivery chute effective for dispensing produce onto one of said projections.

9. The apparatus of claim 8 further comprising a means for slowing the velocity of produce on said delivery chute toward said conveyor.

10. The apparatus of claim 9 wherein said means for slowing comprises a rotating feed brush positioned above said delivery chute a distance effective to allow passage of produce therebetween.

11. The apparatus of claim 9 wherein said means for slowing comprises at least one flexible member extending above said delivery chute.

12. The apparatus of claim 8 further comprising a transfer mechanism intermediate said delivery chute and said conveyor loop, said transfer mechanism comprising a rotating shaft and a plurality of radially spaced projections radiating outwardly therefrom, said radially spaced projections comprising a substantially planar surface of a sufficient size effective to support and carry produce thereon, and wherein said transfer mechanism is positioned such that said radially spaced projections are effective for receiving and carrying produce from said delivery chute when one of said projections is adjacent to said delivery chute.

13. The apparatus of claim 12 wherein said rotating shaft is freely rotating, and said transfer mechanism further comprises a plurality of radially spaced drive arms radiating outwardly from said shaft which are effective for being engaged by said projections extending from said conveyor loop, as said conveyor loop rotates.

14. The apparatus of claim 13 wherein said projections extending from said conveyor loop further comprise a pin extending laterally from at least one end thereof which is effective for engaging said drive arms.

15. The apparatus of claim 12 wherein said transfer mechanism further comprises an arched panel movable between a first position below said delivery chute when one of said projections of said transfer mechanism is adjacent to said delivery chute, and a second position extending outwardly from said delivery chute toward said transfer mechanism when none of said projections of said transfer mechanism are adjacent to said delivery chute, said arched panel at said second position being effective for preventing produce from falling between said chute and said transfer mechanism.

16. An apparatus for gently dispensing produce into a container comprising:

a. a frame;

b. an upwardly disposed, revolving conveyor loop supported by said frame;

c. a plurality of projections extending outwardly from said conveyor loop, said projections being of a sufficient size and extending at an angle effective to support and carry produce thereon as said conveyor revolves before dispensing said produce at approximately the bottom of said loop;

d. first and second side walls, one of said side walls being positioned on each side of said conveyor loop and effective for preventing produce from falling off the sides of said projections;

e. a cover spaced from and extending across at least the lower portion of said conveyor loop on the same side thereof which rotates toward the bottom of said loop, said cover being spaced from said conveyor a distance sufficient to allow the passage of said projections and produce thereon, and further wherein said cover is open at the bottom of said conveyor loop to allow the discharge of produce therefrom;

f. a delivery chute effective for dispensing produce onto one of said projections; and g. a transfer mechanism intermediate said delivery chute and said conveyor loop, said transfer mechanism comprising a rotating shaft and a plurality of radially spaced projections radiating outwardly therefrom, said radially spaced projections comprising a substantially planar surface of a sufficient size effective to support and carry produce thereon, and wherein said transfer mechanism is positioned such that said radially spaced projections are effective for receiving and carrying produce from said delivery chute when one of said projections is adjacent to said delivery chute;

and further wherein said conveyor loop, the interior surface of said cover, and said projections are constructed of or covered with a kinetic energy absorbing material.

17. The apparatus of claim 16 wherein said rotating shaft is freely rotating, and said transfer mechanism further comprises a plurality of radially spaced drive arms radiating outwardly from said shaft which are effective for being engaged by said projections extending from said conveyor loop, as said conveyor loop rotates.

18. The apparatus of claim 17 wherein said projections extending from said conveyor loop further comprise a pin extending laterally from at least one end thereof which is effective for engaging said drive arms.

19. The apparatus of claim 16 wherein said transfer mechanism further comprises an arched panel movable between a first position below said delivery chute when one of said projections of said transfer mechanism is adjacent to said delivery chute, and a second position extending outwardly from said delivery chute toward said transfer mechanism when none of said projections of said transfer mechanism are adjacent to said delivery chute, said arched panel at said second position being effective for preventing produce from falling between said chute and said transfer mechanism.

* * * * *